No. 769,464. PATENTED SEPT. 6, 1904.
J. M. BRADLEY.
METAL CUTTING SAW.
APPLICATION FILED MAR. 18, 1904.
NO MODEL.
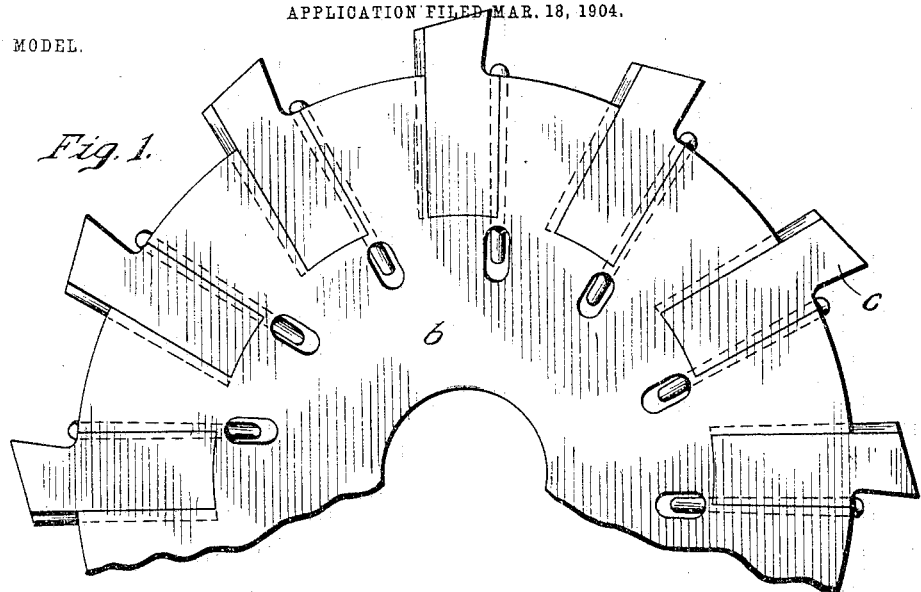
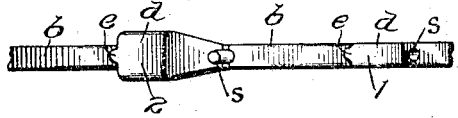
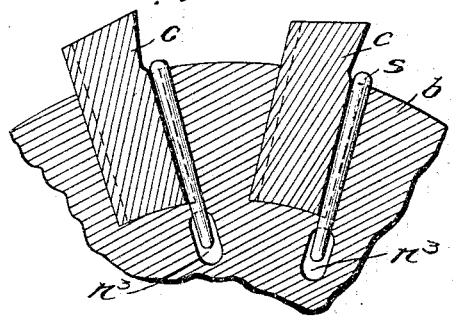
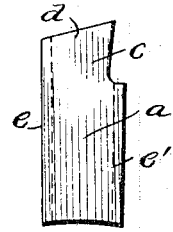
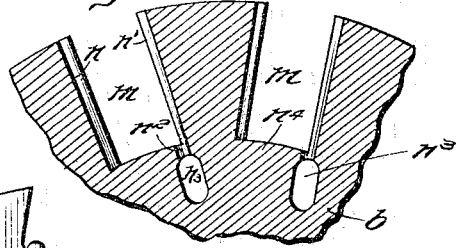
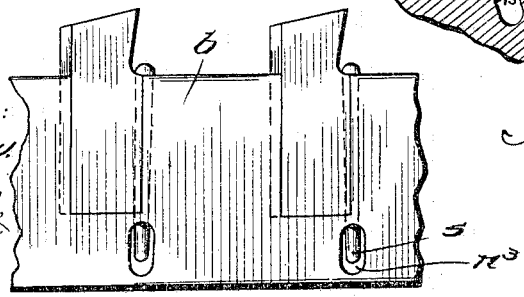
WITNESSES:
F. J. Hartman
A. M. Biddle
INVENTOR
John M. Bradley
BY
H. A. Heuton
ATTORNEY.

No. 769,464. Patented September 6, 1904.

UNITED STATES PATENT OFFICE.

JOHN M. BRADLEY, OF PHILADELPHIA, PENNSYLVANIA, ASSIGNOR OF TWO-THIRDS TO IGNATIUS J. McGEOGH AND HENRY A. CONNELLY, OF PHILADELPHIA, PENNSYLVANIA.

METAL-CUTTING SAW.

SPECIFICATION forming part of Letters Patent No. 769,464, dated September 6, 1904.

Application filed March 18, 1904. Serial No. 198,773. (No model.)

*To all whom it may concern:*

Be it known that I, JOHN M. BRADLEY, a citizen of the United States, residing at Philadelphia, in the State of Pennsylvania, have invented certain new and useful Improvements in Metal-Cutting Saws, of which the following is a full, clear, and exact description, reference being had to the accompanying drawings, forming a part of this specification.

My invention relates to metal-cutting saws and to that type of them in which the teeth are made separate from the saw-body and inserted and held in slots in the periphery thereof; and it has for its object to provide an insertible saw-tooth provided with cheaply-constructive and effective means for retaining it held within a slot in the periphery of the saw-body, and in combination therewith an effective form of slot in the saw-body with keying devices to hold the said elements in permanent relation during the operation of the tool, though readily detachable when desired.

In the drawings illustrating my invention, Figure 1 is a side elevation of a segment of a circular saw-body and teeth therein embodying my invention. Fig. 2 is peripheral view of a segment of the saw-body, showing two teeth in place. Fig. 3 is a vertical section through the lateral center of the saw body and teeth. Fig. 4 is a side elevation of one of the teeth; Fig. 5, a section of a segment of the saw-body with the teeth removed, and Fig. 6 a side elevation showing the invention embodied in a straight instead of a circular saw.

Referring to said drawings, the saw-tooth (represented in detached elevation in Fig. 4) is preferably made of air-hardened steel, annealed and machined, then rehardened. It has in the body portion $a$ substantially parallel flat sides, the thickness between the same being equal to the thickness of the saw-body $b$ at and near its peripheral edge. The cutting portion $c$ of the teeth, which projects beyond the peripheral edge of the saw-body when the elements are assembled for operative use, is inclined on the outer edge at $d$, as seen in Fig. 4, said top or cutting edge $d$ being slightly rounded, as seen in Fig. 2. Said cutting portion $c$ is narrowed in width relatively to the body portion $a$. Each of the longitudinal edge faces of the tooth is provided with holding means, as follows: On the straight side it is provided with a tenon $e$, extending throughout the length of the body and cutting portion, while the opposite edge face is grooved in the body portion of the tooth with a semicircular groove $e'$, extending the length of the body portion only of the tooth.

It is to be observed that in metal-cutting saws the teeth alternate in height and also in thickness in the cutting portion $c$. For example, (see Fig. 2, which is an edge view of a circular body and necessarily in perspective as respects the left-hand tooth,) the right-hand tooth 1 is of the same thickness in its cutting portion as in its body portion, but is slightly higher than its next contiguous tooth 2, while the latter is thicker in its cutting portion, the result of this arrangement being that the tooth 1 cuts by its peripheral edge $d$, while the tooth 2 cuts the metal by its thickened lateral edge.

The saw-body $b$ may be circular, as in Figs. 1 to 3, or straight, as in Fig. 6, and I do not limit my invention to saws for cutting metal, as it may be used advantageously in one or the other form of saw-body for cutting wood or stone. The saw-body $b$, made of steel, (shown in detached view in Fig. 5,) is provided with a series of edge slots $m$ of a depth equal to that of the body portion $a$ of the teeth. Each longitudinal edge of the slot is grooved semicylindrically, (indicated at $n$ $n'$,) and a full round groove $n^2$ extends downward from the lower end of groove $n'$ through the base-wall $n^4$ of the slot into an oblong recess $n^3$, cut from side to side laterally through the body portion $b$ of the saw-body. A locking-pin $s$, made of steel, (see Fig. 3, which shows all the elements assembled in proper relation for operative use,) is provided. Said pin is given a very slight taper toward its inner end, though in longitudinal contour it is substantially round.

The parts being assembled as in Fig. 3, it will be observed that the tenon $e$ on one longitudinal edge of the saw-tooth will enter and register with the contiguous groove $n$ in the slot $m$ of the saw-body, while the groove $e'$ on the opposite side of the saw-tooth will form in contiguous relation to the groove $n'$ of the said slot $m$ a substantially cylindrical recess between them. The beveled retaining-pin is then driven into that recess. Ready means to remove the pin and detach the tooth from the saw-body is provided by the transverse slot $n^3$, into which the lower end of the pin $s$ projects through a suitably-shaped groove $n^2$, connecting the groove $e'$ in the tooth and groove $n'$ in the slot $m$ with said transverse slot $n^3$ in the saw-body.

One great advantage of making the saw-teeth separate from the saw-body is that the latter need not be tempered as hard as required for the teeth. The latter may be made of air-hardened steel, which will not heat under heavy pressure. The saw can be run at vastly increased speed and has all the advantages of a solid air-hardened steel saw without the cost. Another advantage is that broken teeth can easily be replaced with others, that adjustability of teeth in height relatively to the saw-body can be easily effected, giving the saw a wider range of utility, and, finally, my invention enables the detachable teeth to be secured in the saw-body without the intervention of holding means other than a simple locking-pin, as described.

Having thus described my invention, what I claim as new, and desire to secure by Letters Patent, is—

1. The combination with a disk-like saw-body having radial edge slots, of a series of detachable saw-teeth having a body portion registering therewith, a tongue and groove between the same, on one side of each, and a pair of coinciding grooves between them on the other side, with a detachable pin adapted to fill the space formed by said coinciding grooves and operating to lock said elements in rigid and fixed correlation to each other.

2. In combination, a detachable saw-tooth composed of a body portion and a cutting portion, and having one of its longitudinal edges provided with a tongue, the opposite edge being grooved in the body portion of the tooth; a disk-like saw-body provided with a series of radial edge slots having grooves in the oppositely-disposed walls of the slots, transverse slots in the saw-body, a passage-way between each radial slot adjacent to its transverse slot, and a locking-pin adapted to tightly fill the slot formed by the coinciding grooves in the saw body and tooth and extend into the transverse slot in the saw-body.

In testimony whereof I have hereunto affixed my signature this 16th day of March, A. D. 1904.

JOHN M. BRADLEY.

Witnesses:
E. GROFF,
A. HEATON MINNICK.